United States Patent
Chen

(10) Patent No.: US 7,362,077 B2
(45) Date of Patent: Apr. 22, 2008

(54) PRE-CHARGE METHOD FOR ISOLATED BOOST CONVERTER

(75) Inventor: Keming Chen, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 94 days.

(21) Appl. No.: 11/195,855

(22) Filed: Aug. 2, 2005

(65) Prior Publication Data

US 2007/0029982 A1   Feb. 8, 2007

(51) Int. Cl.
*G05F 1/00* (2006.01)
*G05F 1/24* (2006.01)
*H02M 3/335* (2006.01)
*H02M 7/5387* (2007.01)
*H02M 5/00* (2006.01)
*H02M 5/293* (2006.01)

(52) U.S. Cl. .................. 323/222; 323/259; 323/282; 323/344; 363/16; 363/20; 363/24; 363/25; 363/132; 363/159; 363/163

(58) Field of Classification Search ............ 363/16, 363/20, 21, 25, 26, 132, 159, 163, 24; 323/222, 323/259, 344
See application file for complete search history.

(56) References Cited

U.S. PATENT DOCUMENTS

| | | | |
|---|---|---|---|
| 5,654,880 A * | 8/1997 | Brkovic et al. | 363/17 |
| 5,977,754 A * | 11/1999 | Cross | 323/222 |
| 6,038,142 A * | 3/2000 | Fraidlin et al. | 363/17 |
| 6,232,752 B1 * | 5/2001 | Bissell | 323/225 |
| 6,239,584 B1 * | 5/2001 | Jang et al. | 323/222 |
| 6,275,018 B1 * | 8/2001 | Telefus et al. | 323/282 |
| 6,396,137 B1 * | 5/2002 | Klughart | 257/691 |
| 6,452,815 B1 * | 9/2002 | Zhu et al. | 363/17 |
| 6,466,458 B2 * | 10/2002 | Zhang et al. | 363/17 |
| 6,906,930 B2 * | 6/2005 | Jang et al. | 363/17 |
| 6,952,353 B2 * | 10/2005 | Yan et al. | 363/16 |
| 2003/0198064 A1 * | 10/2003 | Zhu et al. | 363/21.01 |
| 2004/0174719 A1 * | 9/2004 | Link | 363/16 |
| 2004/0264224 A1 * | 12/2004 | Jang et al. | 363/97 |
| 2005/0173615 A1 * | 8/2005 | Hontele | 250/203.1 |
| 2005/0195626 A1 * | 9/2005 | Huang et al. | 363/132 |
| 2005/0243579 A1 * | 11/2005 | Jang et al. | 363/16 |
| 2005/0254266 A1 * | 11/2005 | Jitaru | 363/16 |
| 2005/0281059 A1 * | 12/2005 | Yasumura | 363/16 |

* cited by examiner

*Primary Examiner*—Bao Q. Vu
*Assistant Examiner*—Jue Zhang

(57) ABSTRACT

A boost control module operates semiconductor switches of a boost converter circuit in an avalanche mode to precharge a boost output capacitor. The boost control module comprises a switching module that complementarily transitions a first semiconductor switch and a second semiconductor switch between ON and OFF states when a current does not exceed a maximum current threshold. The switching module transitions the first semiconductor switch and the second semiconductor switch to the OFF state when the current exceeds the maximum current threshold. The switching module maintains the first semiconductor switch and the second semiconductor switch in the OFF state until at least one of the inductor current is less than or equal to a minimum current threshold.

13 Claims, 4 Drawing Sheets

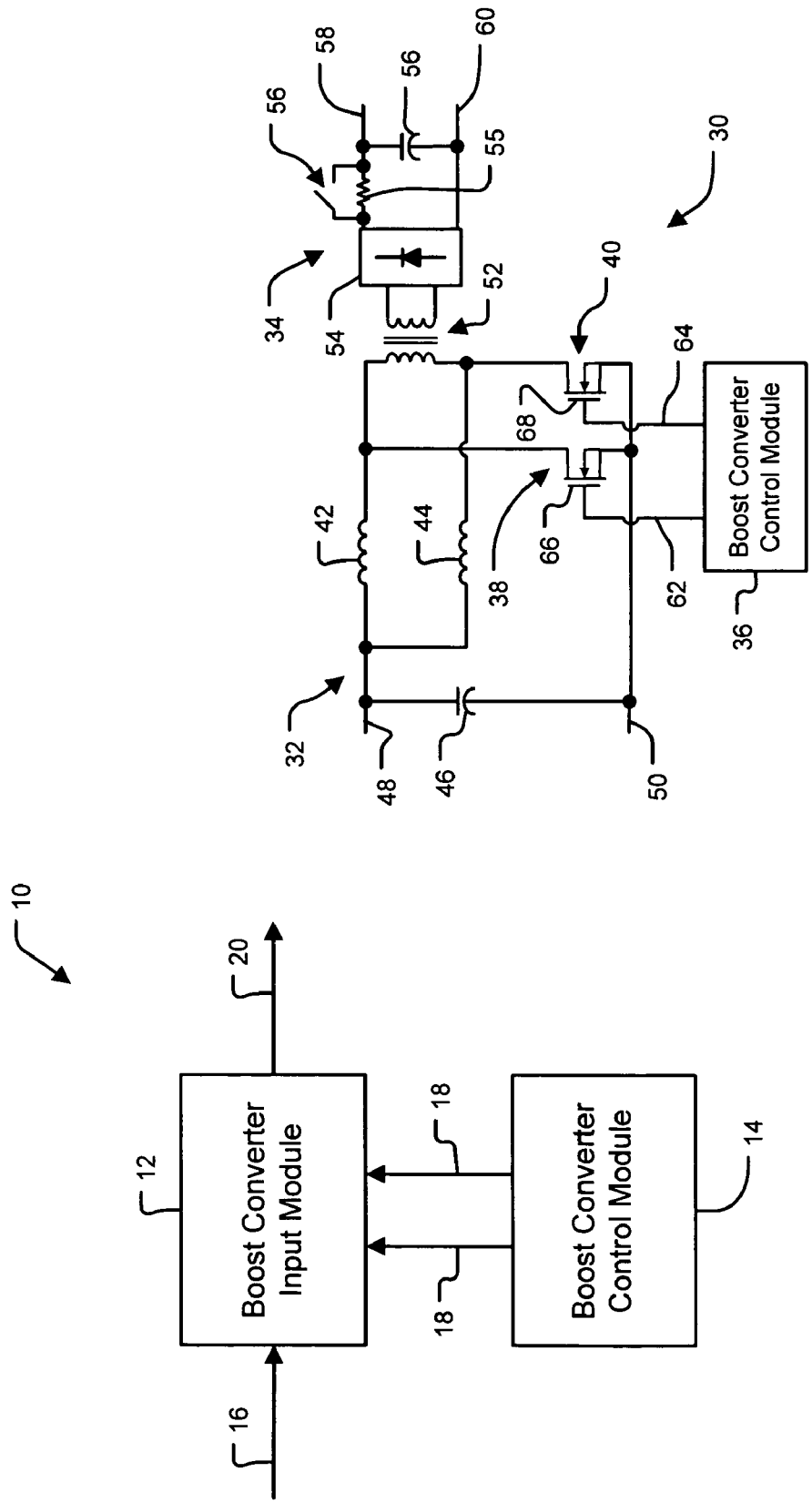

PRE-CHARGE METHOD FOR ISOLATED BOOST CONVERTER

FIELD OF THE INVENTION

The present invention relates to boost converters, and more particularly to a control method that precharges a boost output capacitor of a boost converter.

BACKGROUND OF THE INVENTION

A boost converter circuit is used to produce an output voltage that is greater than an input voltage from a voltage source. Boost converter circuits may also be used for other purposes, such as to provide noise isolation or regulate voltage levels. Referring now to FIG. 1, an exemplary boost converter circuit 10 includes a boost converter input module 12 and a boost converter control module 14. The boost converter input module 12 receives an input voltage 16. The boost converter control module 14 generates one or more control signals 18. The boost converter input module 12 generates an output voltage 20 based on the input voltage 16 and the control signals 18. The output voltage 20 is greater than the input voltage 16.

The boost converter circuit 10 as shown in FIG. 1 may include one or more semiconductor devices. Semiconductor devices, such as MOSFETs, are rated for a maximum voltage. Operation above a maximum (drain-to-source) voltage causes current flow through the device. The current flow is referred to as an avalanche condition. In other words, operating a device above the maximum voltage is referred to as operating the device in an "avalanche mode." Avalanche current flowing through the MOSFET device causes high power dissipation and temperature increase. This does not cause permanent damage to the MOSFET device as long as the energy does not exceed a maximum avalanche energy $E_A$ of the MOSFET device.

SUMMARY OF THE INVENTION

A boost control module for a boost converter circuit that includes a first semiconductor switch having an ON state and an OFF state, a second semiconductor switch having an ON state and an OFF state, and at least one inductor that affects output behavior of the boost converter circuit, comprises a comparing circuit that communicates with the boost converter circuit and that determines whether a current through the inductor exceeds a maximum current threshold. A switching module complementarily transitions the first semiconductor switch and the second semiconductor switch between the ON state and the OFF state when the current does not exceed the maximum current threshold. The switching module transitions the first semiconductor switch and the second semiconductor switch to the OFF state when the current exceeds the maximum current threshold. The switching module maintains the first semiconductor switch and the second semiconductor switch in the OFF state until at least one of the inductor current is less than or equal to a minimum current threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram of an exemplary boost converter circuit according to the prior art;

FIG. 2 is a circuit schematic of an isolated boost converter circuit according to the prior art;

DETAILED DESCRIPTION OF THE PREFERRED EMBODIMENTS

Figure 3:
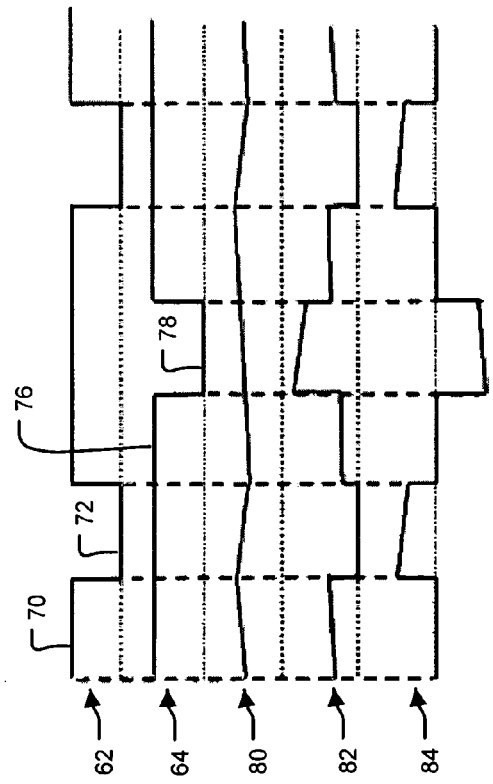
FIG. 3 illustrates operating waveforms of an isolated boost converter according to the prior art and according to a normal operating mode of the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

The present invention operates one or more MOSFET devices in an isolated boost converter circuit in the avalanche mode to precharge a boost output capacitor. Referring now to FIG. 2, an exemplary boost converter circuit 30 is shown. The boost converter circuit 30 includes a boost converter input portion 32, a boost converter isolation portion 34, and a boost converter control module 36. The boost converter input portion 32 includes first and second transistors 38 and 40, first and second inductors 42 and 44, and an input capacitor 46.

The boost converter input portion 32 receives an input voltage Vin across input terminals 48 and 50. The input voltage Vin causes a current through the first inductor 42 to rise and/or fall according to the input voltage Vin, the inductance characteristics of the first inductor 42, and ON or OFF statuses of the first and second transistors 38 and 40. The boost converter isolation portion 34 includes a transformer 52, a rectifier module 54, a precharge resistor 55, and a boost output capacitor 56. Current flows through the transformer 52 according to the ON or OFF statuses of the first and second transistors 38 and 40.

The rectifier module 54 rectifies an alternating current (AC) output of the transformer 52. The rectifier module 54 is any suitable rectifier circuit as is known in the art. When current is flowing through the transformer 52, an output of the rectifier module 54 is an output voltage Vout across output terminals 58 and 60. Additionally, the output of the rectifier module 54 charges the boost output capacitor 56. When current is not flowing through the transformer 52, a charge stored in the boost output capacitor 56 provides the output voltage Vout. The transformer 52 isolates the rectifier module 54 and the boost output capacitor 56 from the boost converter input portion 32.

Conventionally, an initial output voltage Vout is required to be greater than a transformed input voltage (i.e. the output voltage is required to be greater than the transformed input voltage when the boost converter circuit 30 operates normally). When the initial output voltage Vout is not greater than the transformed input voltage, the boost converter circuit 30 is not able to control an initial current through a load (not shown). In other words, the current through the load will rise uncontrollably and may damage the circuit components. The precharge resistor 55 limits the initial current during a startup period of the circuit. A switch 61 is connected in parallel to the precharge resistor 55. The switch 61 is open during the startup period. The switch 61 is closed and shorts out the precharge resistor 55 during normal operation. After a sufficient startup period, the boost converter circuit 30 provides the output voltage Vout.

Referring now to FIG. 2 and FIG. 3, the operation of the first and second transistors 38 and 40 determines the current flow through the first inductor 42 and the transformer 52. The boost converter control module 36 outputs first and second switching signals 62 and 64 that are connected to gate nodes 66 and 68 of the first and second transistors 38 and 40, respectively. The first and second transistors 38 and 40 turn ON and OFF according to the first and second switching signals 62 and 64.

The first transistor 38 is ON when the first switching signal 62 is high as indicated at 70. Conversely, the first transistor 38 is OFF when the first switching signal 62 is low as indicated at 72. The second transistor 40 is ON when the second switching signal 64 is high as indicated at 76. The second transistor 40 is OFF when the second switching signal 64 is low as indicated at 78. In this manner, the first and second switching signals 62 and 64 turn the first and second transistors 38 and 40 ON and OFF.

An inductor current signal 80 indicates a current flowing through the first inductor 42. A first transistor current signal 82 indicates a current flowing through the first transistor 38. A transformer current signal 84 indicates a current flowing through the transformer 52. When at least the first transistor 38 is ON, current through the first inductor 42 rises according to the inductor current signal 80. When the first transistor is OFF, current through the first inductor 42 decreases. As shown, current flows through transformer 52 only when one of the first transistor 38 and the second transistor 40 is OFF. More specifically, current flows through the transformer 52 in a first direction when the first transistor 38 is ON and the second transistor 40 is OFF. Current flows through the transformer 52 in a second direction when the first transistor 38 is OFF and the second transistor 40 is ON.

When both the first and second transistors 38 and 40 are OFF, there is no discharge path for current stored in the first inductor 42 and/or the second inductor 44. In this situation, the current stored in the first and second inductors 42 and 44 will overcome maximum blocking voltages of the first and/or second transistors 38 and 40, causing avalanche current flow. Conventionally, at least one of the transistors 38 and 40 is required to be ON at all times to prevent avalanche current through the transistors 38 and 40.

Figure 4:
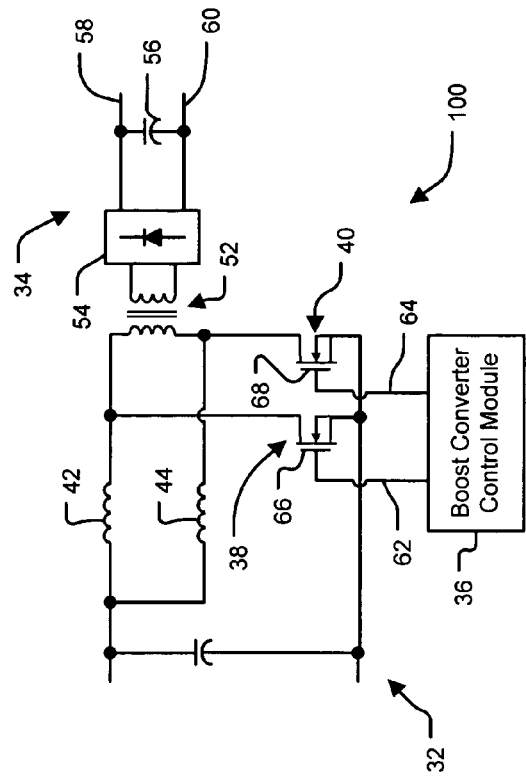
FIG. 4 is a circuit schematic of an isolated boost converter circuit according to the present invention.
Figure 5:
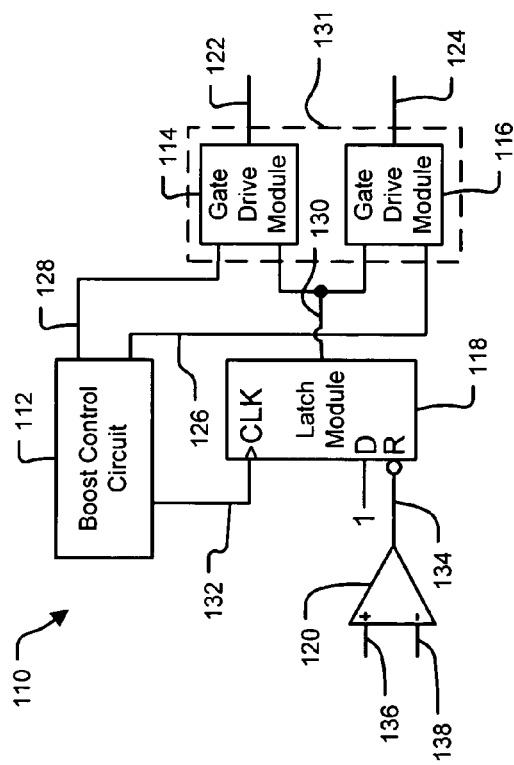
FIG. 5 is a functional block diagram of a boost converter control module according to the present invention.

The present invention operates a boost converter circuit with both transistors OFF to precharge a boost output capacitor. In this manner, a precharge resistor is not required to limit current at startup. Referring now to FIG. 4, an exemplary isolated boost converter circuit 100 according to the present invention eliminates the precharge resistor and contactor as described in FIG. 2. Referring now to FIG. 5, a boost converter control module 110 according to the present invention includes a boost control circuit 112, first and second gate drive modules 114 and 116, a latch module 118, and a comparator 120. The first and second gate drive modules 114 and 116 generate switching control signals 122 and 124 according to boost control signals 126 and 128 and a switch enable signal 130. The first and second gate drive modules 114 and 116 may be integrated within a single switching module 131.

The boost control circuit 112 generates the boost control signals 126 and 128 and a clock signal 132. The latch module 118 generates the enable signal 130 according to the clock signal 132 and a comparator signal 134. The comparator 120 generates the comparator signal 134 according to a current limit signal 136 and an inductor current signal 138. The inductor current signal 138 is indicative of the current through the first inductor 42. The current limit signal 136 is indicative of a maximum current desired current of the first inductor 42. The comparator 120 compares the current limit signal 136 to the inductor current signal 138. When the inductor current signal 138 is less than the current limit signal 136, the comparator signal 134 is a first value. When the inductor current signal 138 is greater than or equal to the current limit signal 136, the comparator signal 134 is a second value.

The boost control circuit 112 controls the first and second gate drive modules 114 and 116 to turn the first and second transistors 38 and 40 ON and/or OFF according to conventional methods during normal operation. During a boost output capacitor precharge phase according to the present invention, the boost control circuit 112 turns the first and second transistors ON and OFF to precharge the boost output capacitor 56. When the inductor current signal 138 is greater than the current limit signal 136, the latch module 118 disables the first and second gate drive module 114 and 116 to turn both of the first and second transistors 38 and 40 OFF.

When both the first and second transistors 38 and 40 are OFF, the current stored in the first and second inductors 42 and 44 causes avalanche current flow through the first and second transistors 38 and 40. In other words, the first and second transistors 38 and 40 operate in the avalanche mode to allow the inductor current to decrease. When the inductor current decreases below a threshold, the boost control circuit 112 releases the reset signal of the latch module 118. In this manner, the boost converter control module 110 operates the first and second transistors 38 and 40 in the avalanche mode for a short period of time to prevent the inductor current from increasing too high.

Figure 6:
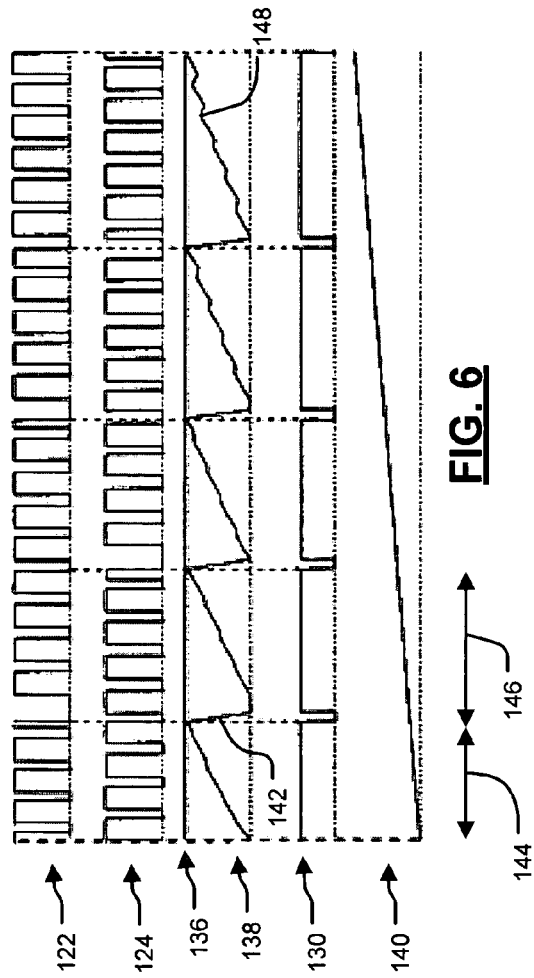
FIG. 6 illustrates operating waveforms of an isolated boost converter according to a precharging mode of the present invention.

Referring now to FIG. 6, the switching control signals 122 and 124 are controlled in a manner similar to the method described in FIG. 3 when the inductor current signal 138 is less than the current limit signal 136. Initially, when the first transistor 38 is ON, the inductor current ramps up linearly at a first rate. When the first transistor 38 is OFF, the inductor current ramps up linearly at a second rate that is less than the first rate. The output voltage 140 across the boost output capacitor 56 gradually ramps up (i.e. the boost output capacitor 56 is charged). When the inductor current is greater than or equal to the current limit signal 136, the enable signal 130 becomes low, turning both the first transistor 38 and the second transistor 40 OFF.

With the first and second transistors 38 and 40 are OFF, the inductor current decreases as indicated at 142. When the inductor current decreases to a predetermined threshold (e.g. zero amps as shown in FIG. 6) the enable signal 130 becomes high, completing a first phase 144. Switching operation of the first and second transistors 38 and 40 resumes. In another implementation, the enable signal 130 may become high after a first period. In other words, the first and second transistors 38 and 40 may be OFF for the first period and then resume the switching operation.

In a second phase 146, the inductor current ramps up linearly when the first transistor 38 is ON at a rate similar to the first rate of the first phase 144. However, when the first transistor 38 is OFF, the inductor current ramps up at a third rate that is less than the second rate of the first phase 144. In subsequent phases, the inductor current ramps up at a decreasing rate and/or ramps down when the first transistor 38 is OFF as indicated at 148. Therefore, more cycles of the first and second transistors 38 and 40 are required for the inductor current to reach the current limit signal 136. In other words, the overall duration of each phase increases for subsequent phases. When the output voltage 140 is sufficient (e.g. reaches a predetermined output voltage threshold), the boost converter control module 110 terminates the precharging method and begins normal operation. For example, the boost converter control module 110 may control the isolated boost converter circuit 30 according to FIG. 3.

Figure 7:
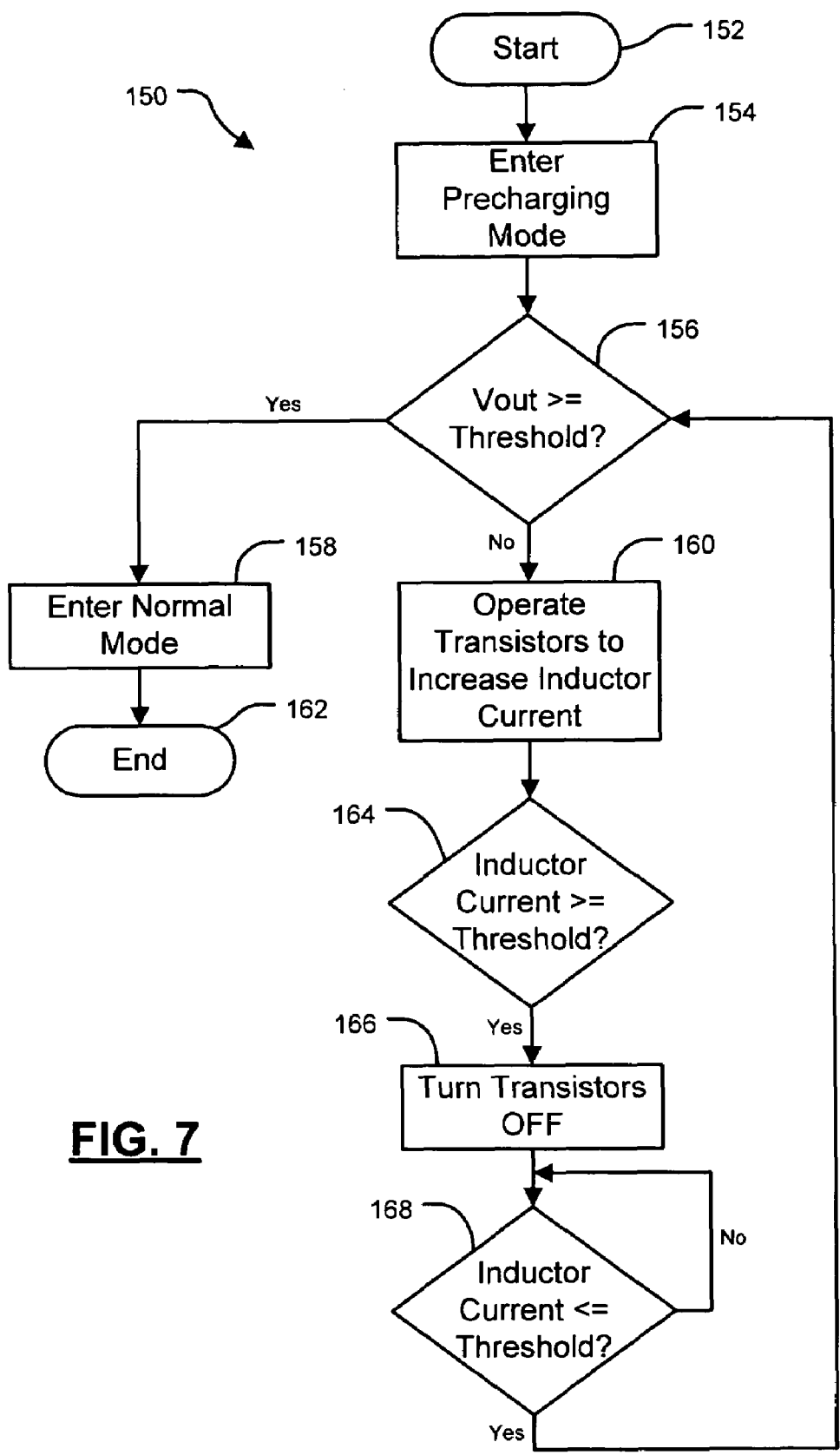
FIG. 7 is a flow diagram that illustrates steps of a precharging method for an isolated boost converter according to the present invention.

Referring now to FIG. 7, an isolated boost converter precharge method 150 begins in step 152. In step 154, the boost converter circuit is powered on and enters a precharging mode. In step 156, the method 150 determines whether the output voltage is greater than or equal to a threshold. If true, the method 150 continues to step 158. If false, the method 150 continues to step 160. In step 158, the method 150 enters a normal mode. In step 162, the method 150 terminates.

In step 160, the method 150 switches the transistors ON and OFF to increase the inductor current. In step 164, the method 150 determines whether the inductor current is greater than or equal to a maximum inductor current threshold. If true, the method 150 continues to step 166. If false, the method 150 continues to step 160. In other words, the method 150 continues to operate the transistors until the inductor current is greater than or equal to the maximum inductor current threshold.

In step 166, the method 150 turns the transistors OFF (i.e. operates the transistors in the avalanche mode). In step 168, the method 150 determines whether the inductor current is less than or equal to a minimum inductor current threshold. If true, the method 150 continues to step 156. If false, the method continues to step 168. In this manner, the method 150 continues to operate in the precharging mode until the output voltage is greater than or equal to a threshold.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A boost control module for a boost converter circuit that includes a first semiconductor switch having an ON state and an OFF state, a second semiconductor switch having an ON state and an OFF state, and at least one inductor that affects output behavior of the boost converter circuit, the boost control module comprising:

a comparing circuit that communicates with the boost converter circuit and that determines whether a current through the inductor exceeds a maximum current threshold; and a switching module that, when the inductor current does not exceed the maximum current threshold, transitions the first semiconductor switch and the second semiconductor switch between the ON state and the OFF state and maintains one of the first semiconductor switch and the second semiconductor switch in the ON state when the other of the first semiconductor switch and the second semiconductor switch is in the OFF state, that transitions the first semiconductor switch and the second semiconductor switch to the OFF state when the inductor current exceeds the maximum current threshold, and that maintains the first semiconductor switch and the second semiconductor switch in the OFF state until the inductor current is one of less than and equal to a minimum current threshold.

2. The boost control module of claim 1 wherein the comparing circuit includes at least one comparator.

3. The boost control module of claim 2 wherein the comparator receives an inductor current signal indicative of the current and a maximum current threshold signal that is indicative of the maximum current threshold, that compares the inductor current signal and the current threshold signal, and that generates a comparator signal according to the inductor current signal and the current threshold signal.

4. The boost control module of claim 1 wherein at least one of the first semiconductor switch and the second semiconductor switch is a transistor.

5. The boost control module of claim 1 further comprising a boost control circuit that communicates with the switching module and that determines switching behavior of the first semiconductor switch and the second semiconductor switch.

6. The boost control module of claim 3 further comprising a latch module that communicates with the comparator and the switching module, and that generates a switching enable signal according to the comparator signal.

7. The boost control module of claim 6 wherein the switching enable signal has a first state and a second state, the switching enable signal is in the first state when the current is less than the maximum current threshold, the switching enable signal is in the second state when the current is greater than or equal to the maximum current threshold, and the first semiconductor switch and the second semiconductor switch are in the OFF state when the switching enable signal is in the second state.

8. The boost control module of claim 1 wherein the switching module includes a first gate drive module that generates a first switch control signal and a second gate drive module that generates a second switch control signal, the first semiconductor switch receives the first switch control signal, and the second semiconductor switch receives the second switch control signal.

9. A boost converter circuit that includes the boost control module of claim 1.

10. A method for precharging a boost output capacitor in a boost converter circuit that includes at least one inductor that affects output behavior of the boost converter circuit, the method comprising:

transitioning a first semiconductor switch and a second semiconductor switch between an ON state and an OFF state;

maintaining one of the first semiconductor switch and the second semiconductor switch in the ON state when the other of the first semiconductor switch and the second semiconductor switch is in the OFF state;

determining whether a current through the inductor is greater than or equal to a maximum current threshold;

simultaneously transitioning the first transistor and the second transistor to the OFF state when the inductor current is greater than or equal to the maximum current threshold; and maintaining the first transistor and the second transistor in the OFF state until the inductor current is one of less than and equal to a minimum current threshold.

11. The method of claim 10 further comprising determining whether a voltage of the boost output capacitor is greater than or equal to a voltage threshold.

12. The method of claim 11 further comprising:

operating in a first mode that includes the steps of transitioning, maintaining, determining, simultaneously transitioning, and maintaining when the voltage is not greater than or equal to the voltage threshold; and operating in a second mode when the voltage is greater than or equal to the voltage threshold, wherein the second mode includes the step of transitioning the first semiconductor switch and the second semiconductor switch between the ON state and the OFF state.

13. A boost control module for a boost converter circuit that includes a first semiconductor switch having an ON state and an OFF state, a second semiconductor switch having an ON state and an OFF state, and at least one inductor that affects output behavior of the boost converter circuit, the boost control module comprising:

a comparing circuit that communicates with the boost converter circuit and that determines whether a current through the inductor exceeds a maximum current threshold; and a switching module that, during a first period, transitions the first semiconductor switch and the second semiconductor switch between the ON state and the OFF state and maintains one of the first and second semiconductor switches in the ON state when the other of the first and second semiconductor switches is in the OFF state, that simultaneously transitions the first semiconductor switch and the second semiconductor switch to the OFF state when said inductor current exceeds said maximum current threshold, and that maintains the first semiconductor switch and the second semiconductor switch in the OFF state during a second period until said inductor current is one of less than and equal to a minimum current threshold.

* * * * *